US00RE47621E

(19) United States
(12) Reissued Patent
Hsiang et al.

(10) Patent Number: US RE47,621 E
(45) Date of Reissued Patent: Sep. 24, 2019

(54) SECURE TRANSACTION MICROCONTROLLER WITH SECURE BOOT LOADER

(71) Applicant: Maxim Integrated Products, Inc., San Jose, CA (US)

(72) Inventors: Peter C. Hsiang, Santa Clara, CA (US); Raymond O. Chock, San Jose, CA (US); Mark Hess, San Francisco, CA (US)

(73) Assignee: Maxim Integrated Products, Inc., San Jose, CA (US)

(21) Appl. No.: 15/189,972

(22) Filed: Jun. 22, 2016

Related U.S. Patent Documents

Reissue of:
(64) Patent No.: 7,343,496
Issued: Mar. 11, 2008
Appl. No.: 10/918,272
Filed: Aug. 13, 2004

(51) Int. Cl.
*G06F 21/86* (2013.01)
*G06F 21/71* (2013.01)
(Continued)

(52) U.S. Cl.
CPC ..... *G06F 21/86* (2013.01); *G06F 21/572* (2013.01); *G06F 21/71* (2013.01); *G06Q 20/20* (2013.01);
(Continued)

(58) Field of Classification Search
CPC .. G06F 21/62; G06F 21/6209; G06F 21/6218; G06F 21/6227; G06F 21/6236;
(Continued)

(56) References Cited

U.S. PATENT DOCUMENTS 4,593,384 A * 6/1986 Kleijne ..... 365/228
5,022,077 A * 6/1991 Bealkowski et al. ..... 711/163
(Continued)

OTHER PUBLICATIONS

W.A. Arbaugh, D.J. Farber, and J.M.Smith, "A secure and Reliable Bootstrap Architecture", Proc. IEEE Symp. Security and Privacy, IEEE CS Press, 1997, pp 65-71.*
(Continued)

*Primary Examiner* — Minh Dieu Nguyen
(74) *Attorney, Agent, or Firm* — North Weber & Baugh LLP

(57) ABSTRACT

A high security microcontroller (such as in a point of sale terminal) includes tamper control circuitry for detecting vulnerability conditions: a write to program memory before the sensitive financial information has been erased, a tamper detect condition, the enabling of a debugger, a power-up condition, an illegal temperature condition, an illegal supply voltage condition, an oscillator fail condition, and a battery removal condition. If the tamper control circuitry detects a vulnerability condition, then the memory where the sensitive financial information could be stored is erased before boot loader operation or debugger operation can be enabled. Upon power-up if a valid image is detected in program memory, then the boot loader is not executed and secure memory is not erased but rather the image is executed. The tamper control circuitry is a hardware state machine that is outside control of user-loaded software and is outside control of the debugger.

75 Claims, 4 Drawing Sheets

(51) Int. Cl.

| | |
|---|---|
| ***G07F 19/00*** | (2006.01) |
| ***G06Q 20/20*** | (2012.01) |
| ***G07F 9/10*** | (2006.01) |
| ***G06F 21/57*** | (2013.01) |

(52) U.S. Cl.
CPC ..... *G07F 9/105* (2013.01); *G07F 19/207* (2013.01); *G06F 2221/2143* (2013.01); *Y10S 257/922* (2013.01)

(58) Field of Classification Search
CPC ..... G06F 21/6245; G06F 21/6254; G06F 21/6263; G06F 21/6272; G06F 21/6281; G06F 21/629; G06F 2212/402
USPC ..... 713/193, 194, 187; 361/654, 672; 726/25
See application file for complete search history.

(56) References Cited

U.S. PATENT DOCUMENTS

| | | | | |
|---|---|---|---|---|
| 5,150,412 | A * | 9/1992 | Maru | 380/43 |
| 5,325,532 | A * | 6/1994 | Crosswy et al. | 713/2 |
| 5,457,748 | A * | 10/1995 | Bergum et al. | 380/270 |
| 5,544,083 | A * | 8/1996 | Iizuka | G06F 21/34 708/131 |
| 5,877,547 | A * | 3/1999 | Rhelimi | 257/679 |
| 5,880,523 | A * | 3/1999 | Candelore | 257/679 |
| 5,930,110 | A * | 7/1999 | Nishigaki et al. | 361/686 |
| 5,935,242 | A * | 8/1999 | Madany et al. | 713/1 |
| 6,105,136 | A * | 8/2000 | Cromer et al. | 726/34 |
| 6,128,694 | A * | 10/2000 | Decker et al. | 711/103 |
| 6,181,803 | B1 * | 1/2001 | Davis | 382/115 |
| 6,237,098 | B1 * | 5/2001 | Libicki | 713/185 |
| 6,246,967 | B1 * | 6/2001 | Libicki et al. | 702/101 |
| 6,292,899 | B1 * | 9/2001 | McBride | 726/22 |
| 6,334,190 | B1 | 12/2001 | Silverbrook et al. | |
| 6,473,861 | B1 * | 10/2002 | Stokes | 713/193 |
| 6,567,787 | B1 * | 5/2003 | Walker et al. | 705/16 |
| 6,745,331 | B1 | 6/2004 | Silverbrook | |
| 6,757,832 | B1 | 6/2004 | Silverbrook et al. | |
| 6,775,778 | B1 * | 8/2004 | Laczko et al. | 713/194 |
| 6,782,479 | B1 * | 8/2004 | Williams et al. | 713/194 |
| 6,836,847 | B1 * | 12/2004 | Zinger et al. | 726/19 |
| 6,941,456 | B2 | 9/2005 | Wilson | |
| 6,942,573 | B2 * | 9/2005 | Elliott | 463/29 |
| 6,975,204 | B1 * | 12/2005 | Silver | 340/5.31 |
| 7,055,029 | B2 * | 5/2006 | Collins | G06F 21/572 380/262 |
| 7,188,282 | B2 * | 3/2007 | Walmsley | 714/718 |
| 7,228,440 | B1 * | 6/2007 | Giles et al. | 713/168 |
| 7,953,989 | B1 | 5/2011 | Hsiang et al. | |
| 2001/0033012 | A1 * | 10/2001 | Kommerling et al. | 257/679 |
| 2002/0166061 | A1 * | 11/2002 | Falik et al. | 713/200 |
| 2002/0199111 | A1 * | 12/2002 | Clark et al. | 713/194 |
| 2003/0005323 | A1 * | 1/2003 | Hanley et al. | 713/194 |
| 2003/0018892 | A1 * | 1/2003 | Tello | 713/164 |
| 2003/0046238 | A1 * | 3/2003 | Nonaka et al. | 705/51 |
| 2003/0135751 | A1 | 7/2003 | ODonnell et al. | |
| 2004/0199786 | A1 | 10/2004 | Walmsley et al. | |
| 2004/0243797 | A1 * | 12/2004 | Yang et al. | 713/2 |
| 2005/0005108 | A1 * | 1/2005 | Harper | 713/165 |
| 2005/0081048 | A1 * | 4/2005 | Komarla et al. | 713/193 |
| 2007/0079043 | A1 * | 4/2007 | Yu et al. | 710/305 |

OTHER PUBLICATIONS

R. Anderson and M. Kuhn "Tamper Resistance—a Cautionary Note", published by the USENIX Association in The Second USENIX Workshop on Electronic Commerce Proceedings, Oakland, California, Nov. 18-21, 1996, pp. 1-11, ISBN 1-880446-83-9.*

"SRAM-Based Microcontroller Optimizes Security", May 14, 2003, published by Maxim, Dallas Semiconductor.*

White Paper entitled: "Secure Terminal Loading System: Using Data Encryption to Improve Merchant Retention" by Hypercom Corporation, Phoenix, Arizona, May 2001, 8 pages.

Product description of "Ingenico 5300" by Groupe Ingenico, Puteaux, France, Sep. 2003, 4 pages.

Product description of "HFT 110 Series Secure Pinpad" by Hypercom Financial Terminals AB, Linkoeping, Sweden, 1999, and other pages downloaded from www.hypercom.com on Jul. 19, 2004, 9 pages.

* cited by examiner

SECURE TRANSACTION MICROCONTROLLER WITH SECURE BOOT LOADER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates generally to secure transaction devices, for example point of sale terminals.

BACKGROUND

Purchases are often made using a secure transaction device called a point of sale terminal. The point of sale terminal is typically coupled to a financial institution via an electronic communication link. A customer in a store may, for example, present a debit card, credit card, cash card or smart card to the store's cashier for payment.

Consider an example of a transaction with a debit card. The customer presents the debit card to the cashier of the store. The cashier swipes the magnetic stripe on the card through a magnetic card reader on the point of sale terminal. The magnetic card reader reads an account number encoded in the magnetic stripe of the card. The customer then, for identification purposes, typically enters a personal identification number (PIN) into a keypad device coupled to the point of sale terminal. The customer may also enter other identification information. The customer may, for example, provide a signature on a signature capture device coupled to the point of sale terminal.

The point of sale terminal then uses an encryption key stored in the point of sale terminal to encrypt the account number (from the swiped debit card), the identification number (for example, the PIN number), and other information about the transaction such as the amount of the transaction and the date of the transaction. The encrypted information is sent from the point of sale terminal to the financial institution via a modem or other electronic communication link.

The financial institution receives the encrypted information and uses an encryption key to decrypt the information and recover the account number, identification information, and information about the transaction. In the case where the transaction is a debit transaction, the bank account of the customer is debited. A confirmation of the transaction is then encrypted using the encryption key and the encrypted confirmation is communicated from the financial institution back to the point of sale terminal. The point of sale terminal uses the encryption key stored in the point of sale terminal to decrypt the confirmation. Typically, the confirmation is printed out as part of a transaction receipt and a copy of the receipt is provided to the customer. The point of sale terminal may include a printer for the purpose of printing the receipt.

Although a debit card having a magnetic stripe is described here as the mechanism by which the account number is entered into the point of sale terminal, there are many other mechanisms that can be used for accomplishing the function of entering an account number into a point of sale terminal. Although the entry of a PIN into a PIN entry keypad is described above as the mechanism by which identification information is entered into the point of sale terminal, there are many other ways of entering identification information into a point of sale terminal. Although a debit card transaction is described above, credit card and other types of transactions may be accomplished using point of sale terminals. Regardless of the details of the point of sale terminal and the type of transaction, in each case sensitive financial and identification information is entered into the point of sale terminal. Encryption keys are typically stored in the point of sale terminal so that the point of sale terminal can communicate with the financial institution in a secure manner.

In one example, the point of sale terminal is a processor-based device having a processor, an amount of secure memory, an amount of FLASH program memory, and an amount of read only memory (ROM). A boot loader program is stored in the ROM. After the manufacture of the hardware of the point of sale terminal, there is no program in the FLASH program memory. Upon power up, then processor checks the status of a predetermined terminal (pin) or jumper. If reading the predetermined terminal or jumper returns a first digital value, then the processor executes the boot loader program stored in the ROM. The boot loader program causes a program to be loaded into the FLASH. The processor may, for example, receive the program from a serial port of the point of sale terminal and write the program into the FLASH program memory. This procedure is utilized to load software into the point of sale terminal at manufacture. The encryption keys are also loaded into the point of sale terminal by this process. The keys are, however, written into the secure memory.

After the program and the encryption keys are loaded, a hardware change is made to the predetermined terminal (pin) or jumper such that subsequent reading of the predetermined terminal (pin) or jumper by the processor will return a second digital value. The processor of the point of sale terminal is then reset. In coming out of reset, the processor reads the status of the predetermined terminal or jumper as it did in the above described example. In this case, however, the processor reads the second digital value. This causes the processor to skip the boot loader program and to execute the program present in FLASH.

Unfortunately, this mechanism for loading programs into point of sale terminals can be used by thieves and criminals to hack into point of sale terminals and to read out sensitive financial information stored in the terminals such as PIN numbers, account numbers, and encryption keys. In one example, a thief steals a point of sale terminal, puts the point of sale terminal into its boot loader mode by changing the voltage on the predetermined terminal, pin or jumper. The thief then uses the boot loader to load a rogue program into FLASH program memory. The thief then resets the terminal. In coming out of reset, the processor of the point of sale terminal executes the rogue program. The rogue program causes the processor to read the contents of the rest of memory on the point of sale terminal and to output that information in some fashion to the thief. In this manner, the thief reads account information, PIN numbers, and encryption keys out of the point of sale terminal. Alternatively, the thief can load a monitor program into the point of sale terminal of an unsuspecting merchant. The monitor program can then record and output sensitive information to the thief over the long term as the point of sale is used.

A boot loader facility need not be provided in a point of sale terminal. There are other ways by which a program can be provided. All program memory from which the processor can execute instructions may, for example, be read only memory (ROM) such that no boot loader program need be provided. Because no boot loader functionality is provided, boot loader functionality cannot be used by a thief for illicit purposes. Unfortunately, however, doing away with the boot loader functionality renders the point of sale terminal less flexible and more difficult to program and update. A solution to the security problem is desired that does not do away with the advantages and desirable aspects of having boot loader functionality.

Not only does the boot loader provide a mechanism by which a thief can hack into a point of sale terminal, but a debugger on the processor can also be used to hack into a point of sale terminal. Many microcontrollers provide on-board debuggers that are usable to monitor and debug processor operation. Such a debugger typically allows the execution of instructions by the processor to be stopped, and the contents of various registers and memory locations to be read and/or written. Instructions can be injected such that the processor can be made to execute the injected instruction. The injected instruction can cause the processor to jump to a desired location and to start executing code from the new location. The injected instruction can cause the processor to output the contents of a memory location or register. The debugger facility therefore provides a way for a thief to read out the contents of memory and to extract the sensitive financial information stored in the memory.

Although a processor that does not have a debugger could be used in a point of sale terminal, having such a debugger is a valuable and useful tool in developing and maintaining point of sale terminals. A solution is desired that prevents unwanted access to the contents of memory of a point of sale terminal, but that allows the point of sale electronics to include useful boot loader and debugger facilities.

SUMMARY

Tamper control circuitry is built into a point of sale terminal. The tamper control circuitry constantly operates to detect any one of numerous vulnerability conditions in which the point of sale terminal is vulnerable to hacking by an individual intent upon extracting sensitive financial information stored in the point of sale terminal. In one embodiment, vulnerability conditions include: 1) a write or attempted write to program memory before the storage locations where sensitive information could be stored is verified to have been erased, 2) a tamper detect condition, 3) the attempted enabling of a debugger by software, 4) the attempted disabling of the debugger by software, 5) a system power-up condition, 6) an illegal temperature condition, 7) the disabling of a temperature sensor that senses the illegal temperature condition, 8) an illegal supply voltage condition, 9) the disabling of a voltage sensor that senses the illegal supply voltage condition, 10) an oscillator failure condition, 11) detection of battery removal, and 12) a battery power power-up condition. If the tamper control circuitry detects one or more of these vulnerability conditions, then the storage locations on the point of sale terminal where the sensitive information could be stored are erased and are verified to have been erased before the boot loader operation and the debugger operation are enabled.

In one embodiment, an encryption key is stored in the point of sale terminal. This encryption key is needed for the point of sale terminal to be able to communicate as a point of sale terminal with a financial institution or verifier of financial information. Communications between the point of sale terminal and the financial institution are encrypted using the encryption key.

In accordance with one embodiment of the present invention, the encryption key stored in the point of sale terminal is automatically erased prior to execution of the boot loader program and before the debugger is enabled. Accordingly, if a thief were to be able to load a rogue program into the point of sale terminal using the boot loader functionality, then the encryption key would already have been erased. Without the encryption key, the point of sale terminal would thereafter be unable to operate as a point of sale terminal and could not be used to gain access to a customer account. Because the encryption key would have been erased prior to the rogue program being loaded onto the point of sale terminal, the rogue program could not operate to read the encryption keys out of memory and output from the point of sale terminal to the thief.

In the same way that the encryption key is erased automatically prior to boot loader and debugger operation, so too is all the memory that could potentially be storing sensitive financial information of customers such as previously stored account numbers and PIN numbers. A rogue program would therefore be unable to access the sensitive information because the sensitive information would have been erased before the rogue program was loaded into the point of sale terminal. Because the debugger is disabled until the erasing of the encryption key and the financially sensitive information has been completed, the debugger is also not usable to read the encryption key or financially sensitive information and to output that information from the point of sale terminal.

In one embodiment, the tamper control circuitry that detects the vulnerability condition and that causes the encryption key and the financially sensitive information to be erased is a hardware state machine. The hardware state machine does not execute software. It operates outside the control of user-loaded software and the processor's debugger. In one embodiment, if a write to program memory is detected before the storage locations where the encryption key and the financially sensitive information might be stored has been erased, then the erasing continues upon a subsequent power-up condition until complete erasure of all such storage locations has been verified as complete. Only when complete erasure is verified is boot loader and debugger functionality enabled. A non-volatile ERASING_MEM bit is provided within the point of sale terminal as a flag to make sure that the need to verify complete erasure is not lost if power is lost during the erasing and verification process before complete erasing and verification has been performed. If power is lost in such a situation, the ERASING_MEM bit is consulted upon the subsequent power-up condition. The ERASING_MEM bit being set causes the tamper control circuitry to seize control from the processor, and to complete the erasing and verification task. Only after the erasing and verification task is complete are the boot loader and the debugging capabilities of the terminal enabled.

In one embodiment, the predetermined terminal (pin) used in the prior art to determine whether to come out of power-up in boot loader mode or in normal operation mode is not necessary and is not provided on the microcontroller. The need to provide a dedicated external terminal (pin) for this purpose is avoided by determining if the program memory has been programmed with a valid image. Not providing an easily observed pin for the dedicated purpose of putting the microcontroller into the boot loader mode helps prevent thieves from activating the boot loader once a valid image has been programmed. If any one of a selected subset of the vulnerability conditions is detected, then the secure memory and the SRAM are automatically erased before the boot loader can be executed. The added cost of having to provide the predetermined terminal (pin) on the microcontroller dedicated to the function of determining whether to enter boot loader mode or normal operation mode is therefore avoided. The terminal on the microcontroller that would otherwise be used for this purpose is therefore usable for other purposes in accordance with one novel aspect.

Even though the secure transaction microcontroller has a debugger, the debugger is not usable to stop the erasure of secure memory and the SRAM once the vulnerability condition has been detected. Even though the microcontroller has a debugger, the debugger is not usable to read out the contents of secure memory or the SRAM once the vulnerability condition has been detected. Even though the microcontroller has a boot loader program, the boot loader program is not usable to load a program into the microcontroller once a vulnerability condition has been detected until the secure memory and SRAM have been erased.

In one aspect, a secure transaction microcontroller stores sensitive information and also stores a valid image of a program. The valid image is stored in program memory whereas the sensitive information is stored in secure memory. If one of a plurality of tamper conditions occurs, then the secure transaction microcontroller detects the tamper condition and automatically erases the sensitive information (for example, encryption keys and sensitive financial information). The secure transaction microcontroller does not, however, erase the valid image of the program that is present in program memory. Subsequent removal and reapplication of power to the microcontroller will therefore not cause the boot loader to be automatically executed because upon the subsequent power up a valid image is found to be present in program memory. Because the boot loader does not automatically execute, a measure of protection is provided that prevents a hacker from figuring out how to cause the boot loader to execute and then using the boot loader to load a rogue program. An identification word is used to identify a program as a valid image. The hacker cannot use the debugger to overwrite the identification word because the point of sale terminal operating system is generally written such that the debugger remains disabled during normal operation.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
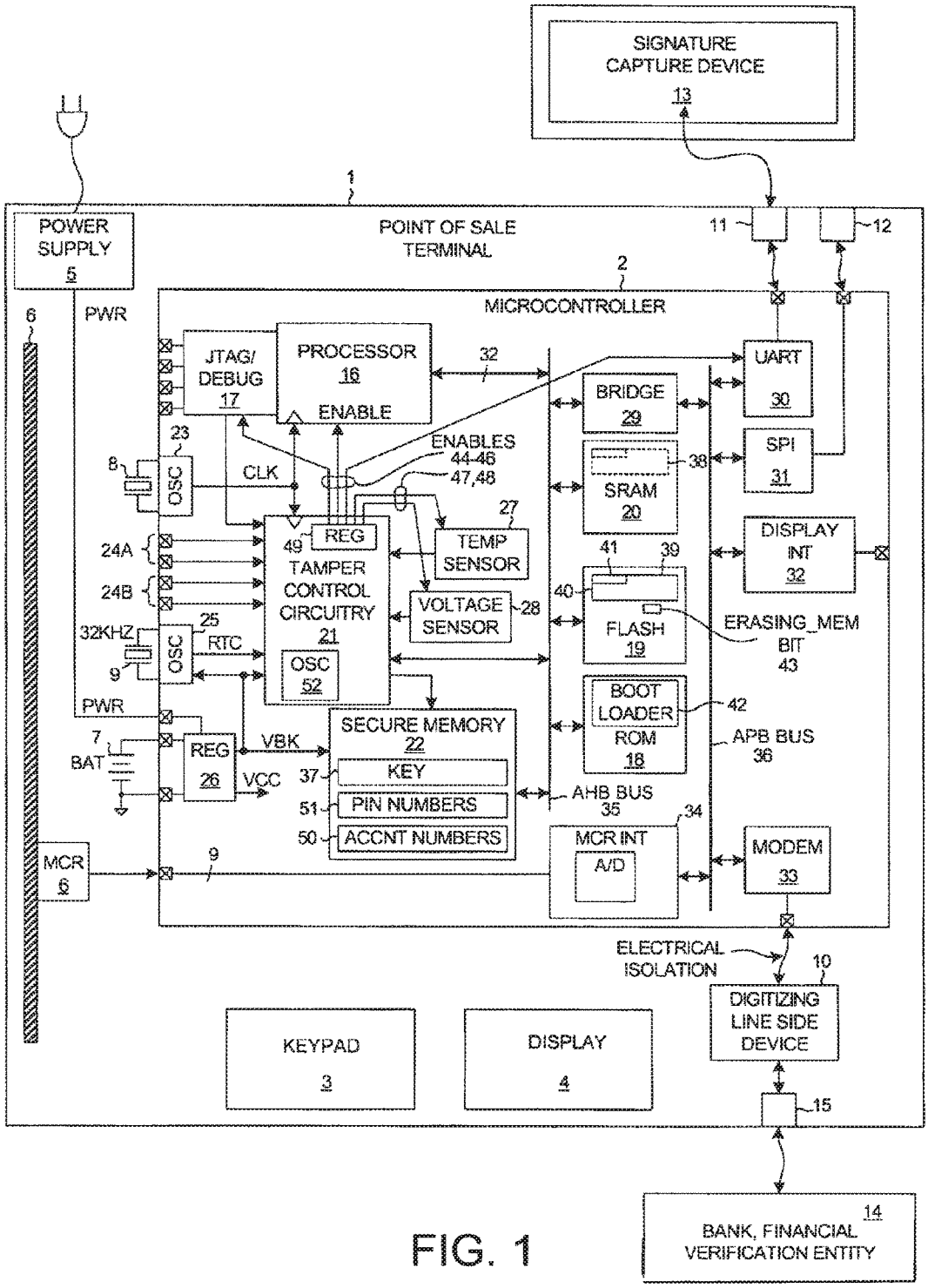
FIG. 1 is a schematic diagram of a point of sale terminal in accordance with one embodiment of the present invention.

FIG. 1 is a schematic diagram of a point of sale terminal 1. Point of sale terminal 1 includes a microcontroller integrated circuit 2, a keypad 3, a display 4, a power supply 5, a magnetic card reader 6, a battery 7, a main system crystal 8, real time clock crystal 9, and a line side device 10. Point of sale terminal 1 has a pair of serial ports 11 and 12. In the illustrated example, point of sale terminal 1 communicates with a signature capture device 13 via serial port 11. Point of sale terminal 1 communicates with a financial institution or other financial verification entity 14 via line side device 10 and a modem port 15. Modem port 15 may be a telephone plug.

Microcontroller integrated circuit 2 includes a processor 16, a JTAG port/debugger 17, an amount of read only memory (ROM) program memory 18, an amount of FLASH program memory 19, an amount of static random access memory (SRAM) 20, tamper control circuitry 21, an amount of secure memory 22, a main system oscillator 23, a plurality of tamper detection terminals 24A and 24B, a real time clock oscillator 25, a supply voltage regulator 26, a programmable temperature sensor 27, a supply voltage sensor 28, a bridge 29, a universal asynchronous receiver and transmitter (UART) 30, a four-wire full duplex serial peripheral interface (SPI) 31, a display interface 32, a modem 33, and a three-track magnetic card reader (MCR) interface 34. Processor 16 can access ROM 18, SRAM 20, FLASH 19, and secure memory 22 via an advanced high performance bus (AHB) 35. Processor 16 communicates with UART interface 30, SPI interface 31, display interface 32, and modem 33 via an advanced peripheral bus (APB) 36. An encryption key 37 is stored in secure memory 22. Secure memory 22 in the present example is battery-backed up SRAM.

The ordinary supply voltage VCC powers all the blocks of microcontroller 2 such that there is minimal drain from battery 7 under normal operating conditions when point of sale terminal 1 is powered by power PWR supplied from power supply 5. If power PWR from power supply 5 is interrupted, then battery 7 provides power such that regulator 26 continues to output backed-up supply voltage VBK to secure memory 22, to tamper control circuitry 21, and to real time clock oscillator 25. The blocks of microcontroller 2 other than regulator 26, secure memory 22, tamper control circuitry 21, RTC oscillator 25, a minimal amount of FLASH 19, and a minimal amount of ROM 18 are not powered when power PWR from power supply 5 is lost.

Tamper control circuitry 21 contains a circuit that detects if the real time clock (RTC) clock signal received from oscillator 25 has slowed too much or has stopped. This circuit may, for example, involve a peak detect that repeatedly charges a bleeding capacitor. An amplifier detects whether the voltage on the capacitor drops below a predetermined amount. Temperature sensor 27 draws a large amount of current when it is operating. To reduce power consumption, the temperature sensor 27 is periodically powered up approximately eight times a second and the temperature is briefly sensed. The remainder of the time the temperature sensor 27 is not powered and is not drawing power. The real time clock signal (RTC) output by real time clock oscillator 25 is used as the time base to perform this periodic temperature sensing. Accordingly, if a thief were to slow the clocking of the real time clock in order to disable the temperature sensor 27, then the voltage on the capacitor in tamper control circuitry 21 would drop to the point that the amplifier would detect the low voltage tamper condition. The output of the amplifier is therefore a tamper detect signal indicative of whether the RTC clock signal has slowed too much or has stopped.

Programmable temperature sensor 27 outputs a signal to tamper control circuitry 21 that indicates when the temperature is in an illegal temperature range (for example, lower than minus 20 degrees Celsius or higher than plus 110 degrees Celsius). The temperature range is programmable under the control of processor 16 by writing to a control register (not shown) associated with the temperature sensor. The temperature sensor 27 is powered up and the output of the temperature sensor 27 is read approximately eight times a second as set forth above.

Voltage sensor 28 outputs a signal to tamper control circuitry 21 that is indicative of the magnitude of the supply voltage VCC that powers the point of sale terminal. Tamper control circuitry 21 contains a register that sets a first voltage that defines the bottom of a permissible operating voltage range and a second voltage that defines the top of the permissible operating voltage range. Once the point of sale terminal is out of its power-up condition and is operating in normal operation mode, if the supply voltage VCC is detected to be outside this permissible operating voltage range then an "illegal supply voltage condition" is detected.

There are two pairs of tamper control terminals, pair 24A and pair 24B. Each of tamper control terminals 24A extends to an external mechanical switch. The switch is held in the depressed (make) state such that a supply voltage is conducted through the depressed switch and to the tamper control terminal. There is a pulldown resistor (not shown) coupled to the tamper control terminal within the microcontroller package. If a thief were to open the enclosure of the point of sale terminal, then the external switch would no longer be depressed. The switch would open, thereby disconnecting the supply voltage from the tamper control terminal of the microcontroller package. The pulldown resistor within the microcontroller package would then pull the voltage on the tamper control terminal to ground. This ground potential on the tamper control terminal is detected by tamper control circuitry 21 as a tamper condition. There are two such tamper control terminals 24A. The pulldown resistors may be integrated onto the microcontroller integrated circuit.

There are two other tamper control terminals 24B. The terminals 24B are to be used in combination with a fine conductive mesh that is disposed over the top of the microcontroller 2 on the printed circuit board within the point of sale terminal. The mesh includes many pairs of very fine wires. The wires of each such pair extend in a serpentine fashion in parallel with one another across the top of the microcontroller. The first of each of the wires of these pairs is coupled to one of the tamper control terminals 24B, whereas the second of each of the wires of these pairs is coupled to the other of the tamper control terminals 24B. If any of the wires is broken, then this condition is detected by tamper control circuitry 21. Also, if any of the first of the wires touches any of the second of the wires, then this condition is detected by tamper control circuitry 21. Accordingly, if a thief were to attempt to probe terminals on the microcontroller 2 by pushing a probe through the mesh, then the probing would likely cause a first wire to touch a second wire and this tamper condition would be detected. If the thief were to attempt to drill a hole in the mesh to obtain access for a probe, this tamper condition would also be detected.

Encryption key 37 is a key that is read out of secure memory 22 by an application program 38 in program memory. Application program 38 uses the encryption key to encrypt communications from point of sale terminal 1 to financial institution 14 and to decrypt communications received back from the financial institution 14. In the present example, the application program is present in FLASH 19 as application program image 39. Application program image 39 includes a body portion 40 and a header portion 41. After power up, the image 39 is typically transferred from FLASH 19 to SRAM 20 to become application program image 38. Processor 16 typically executes the application program image 38 out of SRAM 20.

A boot loader program 42 is stored in ROM 18. If executed by processor 16, this boot loader program 42 interacts with UART 30 such that a program is read into the point of sale terminal 1 via serial port 11, is read into microcontroller 2 via UART 30, passes over APB bus 36, across bridge 29, and is loaded into program memory (either FLASH 19, or SRAM 20) for later execution by processor 16. Initially, when the point of sale terminal is assembled, FLASH 19 is empty. The manufacturer of point of sale terminal 1 uses boot loader program 42 in ROM 18 to load an operating system program and an application layer program into FLASH 19. The application layer program, when executed, runs on top of the operating system and causes processor 16 to exercise and use the various parts of microcontroller 2 so that the point of sale terminal hardware performs the point of sale functionality desired by the manufacturer.

Figure 2A:
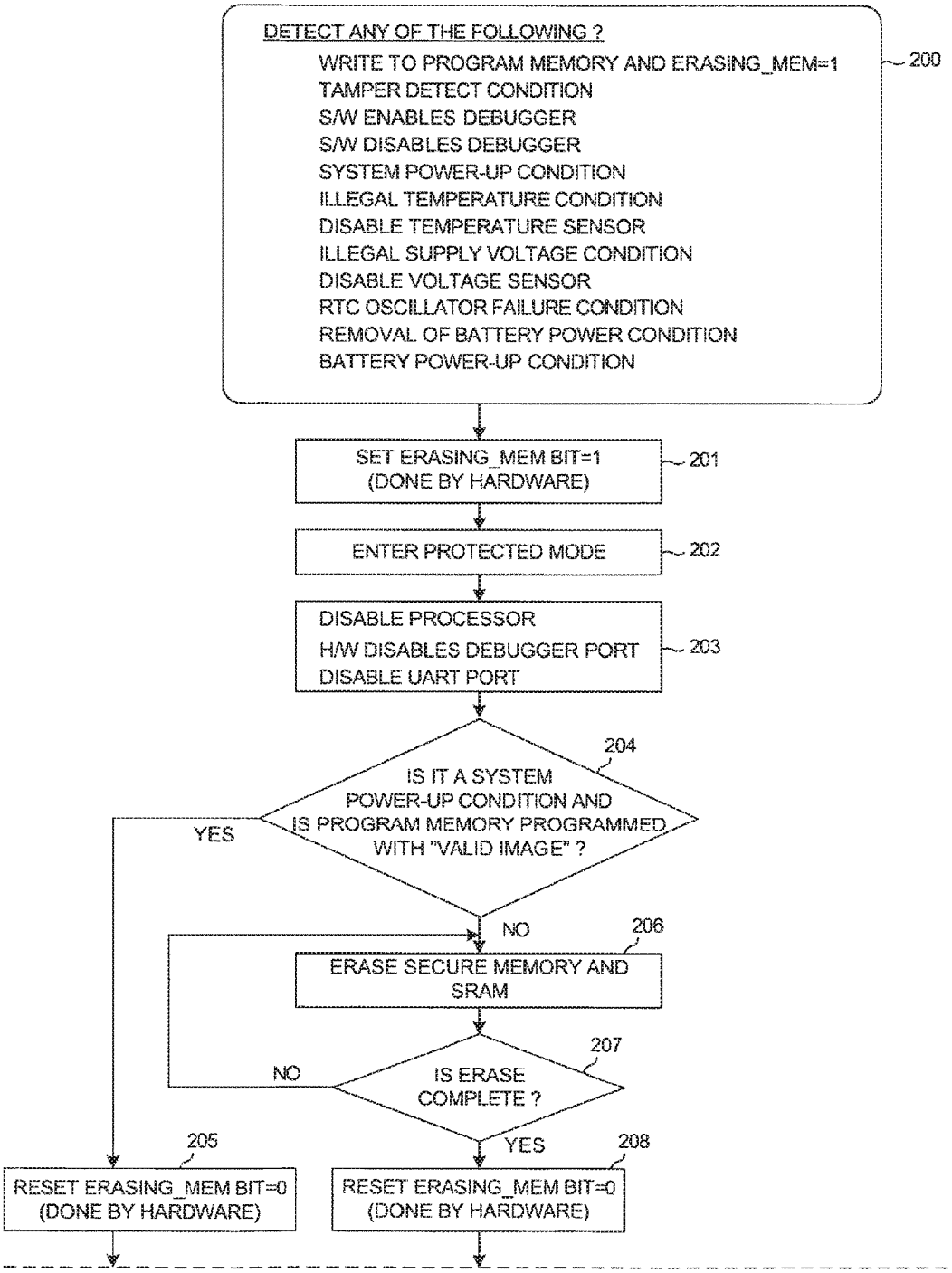
FIGS. 2A and 2B depict a simplified flowchart of a method of operation of the point of sale terminal of FIG. 1.
Figure 2B:
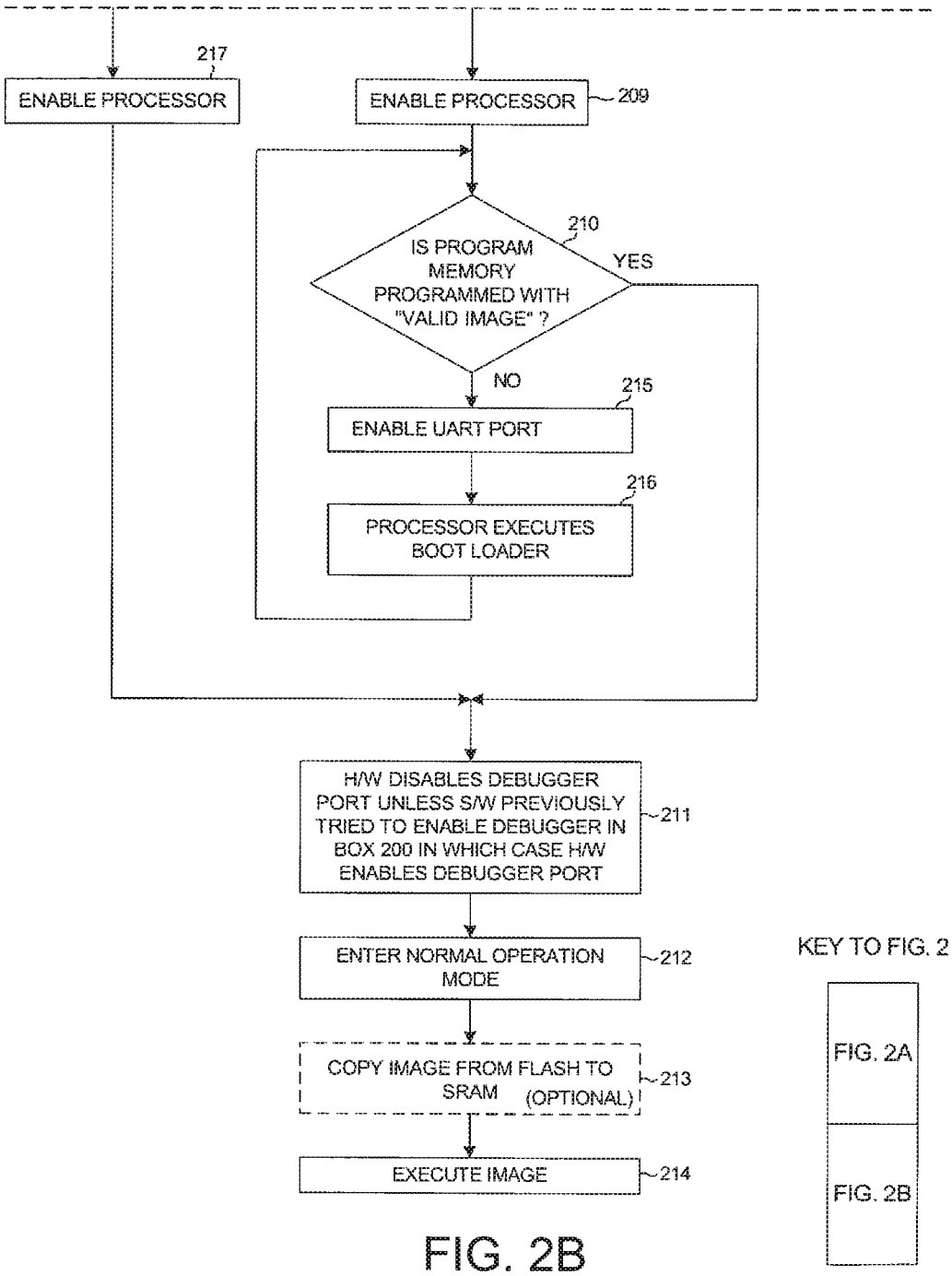

FIGS. 2A and 2B show is a flow chart of a method of operation of point of sale terminal 1 of FIG. 1 in accordance with one embodiment of the present invention. In this method, tamper control circuitry 21 causes encryption key 37 stored in secure memory 22 to be erased automatically and immediately preceding each and every operation of boot loader program 42.

Tamper control circuitry 21 constantly operates to detect (step 200) any one of numerous vulnerability conditions in which the point of sale terminal is deemed to be vulnerable to hacking by an individual intent upon reading out sensitive financial information stored in the point of sale terminal 1. In the present example, these vulnerability conditions include: 1) a write to program memory when a non-volatile ERASING_MEM flag bit 43 is set, 2) a tamper detect condition, 3) an attempt by software to enable the debugger, 4) an attempt by software to disable the debugger, 5) a system power-up condition, 6) an illegal temperature condition, 7) the disabling of the temperature sensor that senses illegal temperature conditions, 8) an illegal supply voltage condition, 9) the disabling of the voltage sensor that senses illegal supply voltage conditions, 10) a real time clock oscillator failure condition, 11) detection of battery removal, and 12) a battery power power-up condition. In the embodiment of FIG. 1, instructions can be executed out of ROM 18, FLASH 19, and SRAM 20. Each of these memories is therefore considered program memory. Hardware circuitry that is part of tamper control circuitry 21 monitors the signals on the control lines of these various parts of program memory and if the signals on the control lines indicate a write is occurring to one of these parts of program memory when the ERASING_MEM bit is one, then the vulnerability condition is detected. The tamper control circuitry 21 including the circuitry that monitors the signals on the control lines of program memory is a hardware state machine circuit that does not execute software instructions. Tamper control circuitry 21 operates outside the control of any program executed by processor 16.

If tamper control circuitry 21 detects any one of the vulnerability conditions, then the ERASING_MEM flag bit is quickly set to a digital one (step 201). If ERASING_MEM was already set with a digital one, then of course the contents of ERASING_MEM remain a digital one. Although the non-volatile ERASING_MEM bit is illustrated here as being a bit in FLASH memory 19, this need not be the case. The ERASING_MEM bit can, for example, be a bit of a non-volatile register located within tamper control circuitry 21. The ERASING_MEM bit can, for example, be a bit of volatile memory where the setting of the ERASING_MEM flag bit involves placing the bit into the digital state in which the volatile memory powers up.

The setting of ERASING_MEM bit 43 is done automatically by hardware and is outside the control of any program executed by processor 16. ERASING_MEM bit 43 being set with a digital one value indicates that secure memory 22 and SRAM 20 are to be erased and should be verified as being erased (unless the condition detected in step 200 was a system power-up condition and a valid image is in program memory) before allowing boot loader execution.

After the detecting of step 200, operation of the point of sale terminal is said to enter a "protected mode" (step 202). Processor 16 is disabled (step 203) from executing instructions, debugger 17 is disabled by the tamper control circuitry 21, UART interface 30 is disabled, temperature sensor 27 is enabled, and voltage sensor 28 is enabled. Each of processor 16, debugger 17, and UART interface 30 is disabled by removing an enable signal that is supplied via a respective one of three enable lines 44-46. Each of temperature sensor 27 and voltage sensor 28 is enabled by supplying an enable signal via a respective one of two enable lines 47 and 48. The signals on enable lines 44-48 are determined by the contents of respective bits of a tamper control register 49 within tamper control circuitry 21. At this point in the method of FIG. 2A, processor 16 is disabled and debugger 17 is disabled. Neither processor 16 nor debugger 17 can therefore write to tamper control register 49 to either enable or disable any of JTAG/debugger 17, processor 16, UART 30, temperature sensor 27, or voltage sensor 28. At this point in the method of FIG. 2A, debugger 17 is disabled.

Next (step 204), tamper control circuitry 19 determines whether the condition detected in step 200 is a system power-up condition that occurred when a valid image was present in program memory. If a valid image is present, then the boot loader is bypassed.

Figure 3:
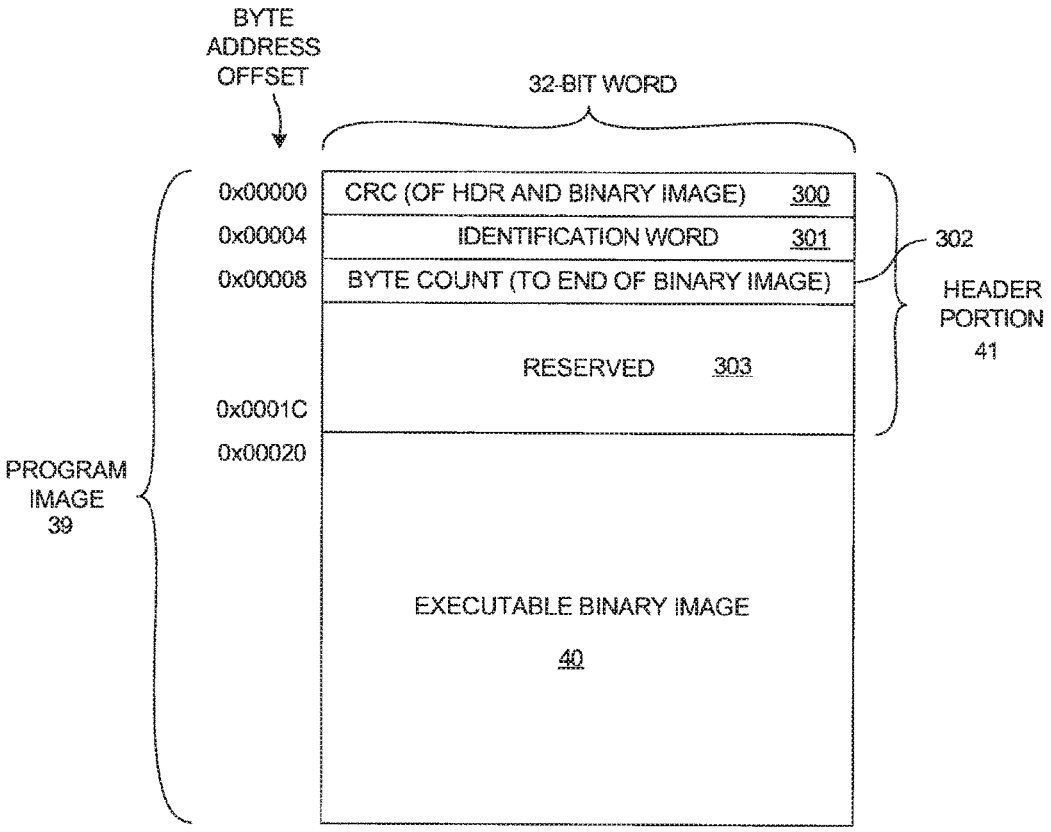
FIG. 3 is a diagram of a valid program image.

FIG. 3 is a simplified diagram of valid image 39 of an application program stored in program memory. Image 39 includes executable binary image body portion 40 and header portion 41. Header portion 41 in turn includes a cyclic redundancy check (CRC) portion 300, an identification word 301, a byte count portion 302, and a reserved portion 303. CRC portion 300 is a CRC of header portion 41 as well as body portion 40. The byte count portion 302 is a byte count usable to determine the end of the body portion 40 in memory. It is indicative of the size of the image. Identification word 301 is a special password that is usable to verify that the image is a valid image. Only authorized entities (for example, the point of sale terminal manufacturer and authorized customers of the manufacturer) are allowed to know the password.

Tamper control circuitry 21 performs the check (step 204) that a valid program image is present in program memory by checking the location in program memory where the identification word 301 would be stored if the image were a valid image. If the value stored at this location is the proper identification word, then tamper control circuitry 21 determines that the image is a valid image. If the image is a valid image and a power-up condition was detected in step 200, then processing proceeds to step 205.

In step 205, the ERASING_MEM bit is reset to a digital zero value. The ERASING_MEM bit is reset to zero because powering up the terminal when a valid image is stored in the terminal is not to cause secure memory to be erased, but rather the point of sale terminal is to be allowed to run in normal operation mode. Once ERASING_MEM 43 bit is reset, the processor is enabled (step 217) by supplying an enable signal to processor 16 via enable line 45. Tamper control circuitry 21 disables the debugger 17 unless software had previously tried to enable the debugger and this condition was detected back in step 200 in which case the tamper control circuitry 21 enabled the debugger 17. Processor 16 then enters "normal operation mode" (step 212), copies image 39 from FLASH 19 to SRAM 20 (step 213), and executes the program out of SRAM 20 (step 214).

Returning to step 204, if either the condition that was detected in step 204 was not a power-up condition or if a valid image was not detected in program memory, then processing proceeds to block 206. Secure memory 22 is erased under the control of the hardware of tamper control circuitry 21. Tamper control circuitry 21 is clocked by its own internal oscillator 52 during this erasing of secure memory 22. Tamper control circuitry 21 drives the signals on the control lines of secure memory 22 so as to erase the entire secure memory 22. The contents of secure memory 22 including encryption key 37 is therefore erased.

To conserve power, system clock CLK is disabled during the erasure of secure memory 22. To further reduce power consumption, as many of the peripherals as possible (for example, UART 30, display interface 32, modem 33, card reader 34) are also disabled during the erasure of secure memory 22.

If point of sale terminal 1 were in operation when the vulnerability condition occurred, then processor 16 may have been using encryption key 37. The processor may, for example, have read encryption key 37 out of secure memory 22 and may have been using it to encrypt information. During this process, encryption key 37 would be temporarily stored elsewhere in the circuitry of point of sale terminal 1, most likely in SRAM 20. Accordingly, SRAM 20 is erased as well so that if encryption key 37 were temporarily stored in SRAM 20, it is erased.

The procedure of erasing secure memory 22 and SRAM 20 may require a sequence of operations and therefore may take a significant amount of time. If, for example, a thief were to cut power to point of sale terminal 1 during this operation, then it might be possible that enough energy would not be present in the point of sale terminal to complete the erasing of all the secure memory 22 and all of SRAM 20. If the incomplete erasure of these memories left encryption key 37 in one of these memories, and if these memories could be examined and their contents read out, then it would be possible that encryption key 37 could be read out of the point of sale terminal by a thief. Accordingly, a check is made (step 207) to make sure all secure memory 22 and SRAM 20 have been erased before boot loader 42 is allowed to execute. If power is removed during erasing step 206 and is then reapplied, then the tamper control method described will revisit erasing step 206 after the power-up and erasing will continue until secure memory 22 and SRAM 20 are fully erased. Only after these memories 22 and 20 are fully erased, can boot loader program 42 be executed. The setting of ERASING_MEM bit 43 upon a tamper condition is assured because there is enough energy capacitively stored within microcontroller 2 to enable and power the setting of the ERASING_MEM bit in step 201, even if power from supply power 5 is cut to the point of sale terminal and even if battery 7 is not present.

It is recognized that there is a remote chance that the encryption key might be present in an internal register within processor 16 at the time the vulnerability condition occurs and at the time processor operation is suspended. In such a situation, erasing secure memory 22 and SRAM 20 may not erase all places in the point of sale terminal 1 that encryption key 37 might be stored. A hacker may, therefore, be able to read out encryption key 37 under this improbable situation. Accordingly, in some embodiments, the internal registers of processor 16 are also erased in step 206. In the same way, any other location that the encryption key 37 might be temporarily stored within the particular type of point of sale terminal being used may be erased in step 206.

Once secure memory 22 and SRAM 20 are verified (step 207) as having been fully erased, then the ERASING_MEM bit 43 is reset to a digital zero (step 208) and processor 16 is enabled (step 209). If there is a valid image of an application program present in program memory (step 210), then processing proceeds to step 211, "normal operation mode" is entered (step 212), valid image 39 in FLASH is transferred by processor 16 from FLASH 19 to SRAM 20 (step 213), and the image is executed (step 214) out of SRAM. Once in "normal operation mode," preventing a hacker from loading undesirable code into the point of sale terminal is the responsibility of the operating system software and the application layer programs written by the manufacturer of the point of sale terminal. Note that image-copying step 213 is optional. Rather than copying the image into SRAM and then executing out of SRAM, it is also possible to skip step 213 and to execute image 39 directly out of FLASH program memory.

In step 210 if there is no valid program image in program memory, then tamper control circuitry 21 enables UART interface 30 (step 215) by setting the appropriate bit in tamper control register 49, thereby supplying an enable signal over enable line 46.

Next (step 216), processor 16 executes boot loader program 42 out of ROM 18. Execution of boot loader program 42 causes bridge 29 and UART interface 30 to cooperate such that a program can be read from serial port 11 of the point of sale terminal, into the point of sale terminal, into microcontroller 2 via the UART, across APB bus 36, through bridge 29, and into program memory. The program can be loaded into either FLASH 19 or SRAM 20. The program loaded may be an operating system program, or may be an application layer program that runs on an operating system program, or may be a composite program including both an operating system portion as well as an application layer portion. If execution of boot loader program 42 fails to work properly and load a valid image, then this condition will be detected in step 210 and the boot loader program 42 will be executed again.

Once a valid image has been loaded into program memory, processing proceeds to step 211. The debugger is disabled unless software had previously attempted to enable the debugger (step 211). This is accomplished by tamper control circuitry 21 setting or resetting an appropriate bit in tamper control register 49. Processing is then said to enter the "normal operation mode" (step 212). The loaded program is copied from FLASH to SRAM (optional) and is executed (step 214).

Accordingly, if a power-up condition occurs and there is a valid image in program memory, then the image is executed in the "normal operation mode." If any other vulnerability condition is detected, then secure memory 22 and SRAM 20 are erased in the "protected mode" before execution of the boot loader program 42 is possible and before the debugger can be used to read out the contents of secure memory 22 or SRAM 20. If a thief manages to load a rogue program into point of sale terminal 1 using boot loader or debugger functionalities, then encryption key 37 will have been erased automatically before the loading of the rogue program occurred. Without encryption key 37, point of sale terminal 1 will not properly encrypt information sent to financial institution 14 and therefore will be non-operable.

Sensitive information other than encryption key 37 is also typically stored in point of sale terminal 1. When information from a credit card, a debit card, a smart card, or a pre-paid cash card is swiped or otherwise read into point of sale terminal 1 to carry out a transaction, an account number of the customer is stored in the point of sale terminal, at least temporarily. In one embodiment, such account numbers 50 are stored in secure memory. The names of credit card holders are similarly read into and stored in point of sale terminal 1. In addition to account numbers 50, customers may enter their personal identification numbers (PINS) 51 into keypad 3 or into a PIN pad (not shown) that is part of, or is coupled to point of sale terminal 1.

If, for example, the transaction is a debit card transaction, then the debit card is swiped such that magnetic card read 6 reads the account number and card holder name from the card. The account number and card holder name is stored in secure memory 22. The customer is then requested to type a PIN number into a PIN pad (not shown) coupled to the point of sale terminal (for example, via UART serial port 11). The PIN number is stored in point of sale terminal 1, at least temporarily. The PIN number, account number, and other information about the transaction (such as the amount of the transaction, the merchant name and the date and time of the transaction) are then generally encrypted using encryption key 37. The resulting encrypted information is sent to the financial institution 14 that controls the customer's account via line side device 10 and modem port 15. Financial institution 14 uses an encryption key to decrypt the encrypted information. If financial institution 14 authorizes the transaction, then the user's account is debited, and a transaction identification number is returned to the point of sale terminal in encrypted form. Point of sale terminal 1 uses encryption key 37 to decrypt the transaction identification number. The transaction identification number may be printed out by a printer (not shown) that is part of the point of sale terminal or is coupled to the point of sale terminal via serial port 12.

It is therefore seen that sensitive financial information (for example, PIN numbers and account numbers) are stored in point of sale terminal 1, at least temporarily. In one embodiment, PIN numbers 51 and account numbers 50 and card holder names are stored in secure memory 22 in addition to an encryption key 37. In the same fashion that erasing secure memory 22 and SRAM 20 erases the storage locations where encryption key 37 may be stored, so too does the erasing of secure memory 22 and SRAM 20 erase the storage locations where PIN numbers 51 and account numbers 50 and card holder names may be stored.

Although an embodiment is described above wherein the test of step 204, the erasing of secure memory 22 (steps 206-207), and the verification of the erasure of secure memory 22 are performed by a hardware state machine when processor 16 is disabled, other embodiments are possible. In one embodiment, processor 16 is not disabled in step 203 but rather processor 16 performs the test of step 204. Processor 204 determines whether a valid image is present in program memory. The entirety of the program that performs these functions is stored in ROM 18 and is executed out of ROM 18. Debugger 17 is disabled (step 203) during this execution so that processor 16 cannot be made to jump out of the program in ROM 18 until processing in the "protected mode" is completed.

In accordance with one embodiment, software being executed by processor 16 can attempt to enable debugger 17 by attempting to set the bit in tamper control register 49 that corresponds to debugger 17. This constitutes a vulnerability condition and is detected in step 200. Rather than sending an enable signal to debugger 17 via enable line 44, tamper control circuitry 21 immediately disables the debugger (step 203) and makes sure that encryption key 37 is erased (steps 206-207) before the debugger 17 is actually enabled in step 211. Debugger 17 is enabled in step 211 if software had previously attempted to enable debugger 17 by attempting to write to the tamper control register 49. It is in step 211 that the enable signal is sent over enable line 44 to debugger 17.

Although certain specific exemplary embodiments are described above in order to illustrate the invention, the invention is not limited to the specific embodiments. Although the existence of a predetermined password in a predetermined location in a program image is described above as a way to determine that the program image is a valid image, other ways of determining that an image is a valid image are possible. Accordingly, various modifications, adaptations, and combinations of various features of the described embodiments can be practiced without departing from the scope of the invention as set forth in the claims.

What is claimed is:

1. An integrated circuit, comprising:

a processor;

a first amount of memory that stores a boot loader program;

a second amount of memory that stores an encryption key; and tamper control circuitry that causes the encryption key to be erased before the boot loader program can be executed.

2. The integrated circuit of claim 1, further comprising:

program memory, wherein the tamper control circuitry detects a write to the program memory and in response thereto causes the encryption key to be erased from the second amount of memory.

3. The integrated circuit of claim 1, wherein the tamper control circuitry detects a power-up condition and in response thereto causes the encryption key to be erased from the second amount of memory.

4. An integrated circuit, comprising:

a processor;

a first amount of memory that stores a boot loader program;

a second amount of memory that stores an encryption key;

tamper control circuitry that causes the encryption key to be erased before the boot loader program can be executed; and a debugger that can be enabled and disabled, wherein the tamper control circuitry detects an enabling of the debugger and in response thereto causes the encryption key to be erased from the second amount of memory.

5. The integrated circuit of claim 1, wherein the tamper control circuitry detects an illegal temperature range condition and in response thereto causes the encryption key to be erased from the second amount of memory.

6. The integrated circuit of claim 1, further comprising:

a tamper detect terminal, wherein the tamper control circuitry reads a tamper condition from the tamper detect terminal and in response thereto causes the encryption key to be erased from the second amount of memory.

7. The integrated circuit of claim 1, wherein the tamper control circuitry is a hardware state machine that does not execute instructions.

8. The integrated circuit of claim 1, wherein the second amount of memory is battery-powered random access memory (RAM).

9. The integrated circuit of claim 1, wherein the integrated circuit is part of a point of sale terminal.

10. The integrated circuit of claim 1, wherein the integrated circuit is part of a point of sale terminal, the point of sale terminal having a serial port, and wherein the boot loader program is operable to cause a program to be loaded into the point of sale terminal through the serial port.

11. An integrated circuit, comprising:

a processor;

a first amount of memory that stores a boot loader program;

a second amount of memory that stores an encryption key;

tamper control circuitry that causes the encryption key to be erased before the boot loader program can be executed; and program memory, wherein the tamper control circuitry in response to a power-up condition determines whether a valid image is present in the program memory, and wherein if [a] *the* valid image is determined to be present in *the* program memory then the tamper control circuitry does not cause the *encryption* key to be erased but rather causes the *valid* image to be executed by the processor.

12. A method, comprising:

(a) detecting a vulnerability condition on a microcontroller, the microcontroller storing an encryption key;

(b) in response to said detecting in (a) automatically erasing said encryption key; and (c) only after said encryption key is erased in (b) executing a boot loader program on the microcontroller, wherein the boot loader program is stored on the microcontroller.

13. The method of claim 12, wherein the microcontroller is part of a point of sale terminal, and wherein the vulnerability condition is taken from the group consisting of: a tamper detect condition, a battery removal condition, an illegal temperature condition, and an illegal supply voltage condition.

14. A method, comprising:

(a) detecting a vulnerability condition on a microcontroller, the microcontroller storing an encryption key:

(b) in response to the detecting in (a) automatically erasing the encryption key; and (c) only after the encryption key is erased in (b) executing a boot loader program on the microcontroller, wherein the boot loader program is stored on the microcontroller, wherein the microcontroller is part of a point of sale terminal, and wherein the vulnerability condition is an enabling of a debugger of the microcontroller.

15. The method of claim 12, wherein the microcontroller includes a memory that stores credit card numbers, the encryption key also being stored in the memory, and wherein the entire memory is erased in (b).

16. A method, comprising:

(a) detecting a vulnerability condition on a microcontroller, the microcontroller having a debugger and storing an encryption key:

(b) in response to the detecting in (a) automatically erasing the encryption key;

(c) only after the encryption key is erased in (b) executing a boot loader program on the microcontroller, wherein the boot loader program is stored on the microcontroller; and (d) disabling the debugger in response to the detecting in (a) and prior to the execution of the boot loader program in (c).

17. The method of claim 12, wherein the microcontroller includes a non-volatile bit, the method further comprising:

(d) setting the non-volatile bit in response to said detecting in (a) and prior to the execution of the boot loader program in (c).

18. The method of claim 17, wherein the vulnerability condition is a tamper detect condition, wherein the microcontroller includes a memory, and wherein the boot loader program is not executed after a power-up condition if a valid program image is detected to be present in the memory in the microcontroller.

19. An integrated circuit, comprising:

a processor;

a first amount of memory that stores an encryption key;

a second amount of memory that stores a boot loader program; and means for detecting a vulnerability condition and is response thereto automatically erasing the encryption key from the first amount of memory before the boot loader program can be executed by the processor.

20. The integrated circuit of claim 19, wherein the vulnerability condition is taken from the group consisting of: a tamper detect condition, an illegal temperature detect condition, an illegal voltage supply condition.

21. The integrated circuit of claim 19, wherein the integrated circuit can also store a second program, and wherein the means is also for making a determination whether the second program is valid and if the second program is determined to be valid then not automatically executing the boot loader program but rather executing the second program whereas if the second program is determined to be invalid or if there is no valid program stored in the integrated circuit then automatically executing the boot loader program.

22. An integrated circuit, comprising:

a processor;

a first amount of memory that stores an encryption key:

a second amount of memory of memory that stores a boot loader program; and means for detecting a vulnerability condition and in response thereto automatically erasing the encryption key from the first amount of memory before the boot loader program can be executed by the processor, wherein the integrated circuit includes a debugger, and wherein the debugger is not usable to stop said erasing of the encryption key.

*23. The integrated circuit of claim 1 further comprising:*

*a first oscillator coupled to the processor, the first oscillator generates a first signal from which a system clock is derived; and*

*a second oscillator coupled to the tamper control circuitry, the second oscillator generates a second signal to detect a tamper event.*

*24. The integrated circuit of claim 23 wherein the second oscillator is coupled to a real time clock, an output of the real time clock is monitored to detect the tamper event.*

*25. The integrated circuit of claim 24 wherein the output of the real time clock is used to detect a temperature variation indicative of the tamper event.*

*26. The integrated circuit of claim 1 further comprising at least one temperature sensor coupled to the tamper control circuitry, the at least one temperature sensor detects a temperature variation associated indicative of the tamper event.*

*27. The integrated circuit of claim 26 wherein an output of the at least one temperature sensor is compared to a threshold temperature value to identify the tamper event.*

*28. The integrated circuit of claim 27 wherein the threshold temperature value is programmable.*

*29. The integrated circuit of claim 1 further comprising at least one voltage sensor coupled to the tamper control circuitry, the at least one voltage sensor detects a voltage variation indicative of the tamper event.*

*30. The integrated circuit of claim 29 wherein an output of the at least one voltage sensor is compared to a threshold voltage value to identify the tamper event.*

*31. The integrated circuit of claim 1 further comprising a plurality of serial ports, at least one of the ports within the plurality of serial ports interfaces with an external device in accordance with a Serial Peripheral Interface protocol.*

*32. The integrated circuit of claim 1 wherein the first amount of memory comprises a Read Only Memory.*

*33. The integrated circuit of claim 1 wherein the second amount of memory comprises a plurality of registers within the integrated circuit.*

*34. The integrated circuit of claim 1 wherein the second amount of memory comprises a RAM memory.*

*35. The integrated circuit of claim 1 wherein the second amount of memory comprises a Flash memory.*

*36. The integrated circuit of claim 1 further comprising program memory coupled to the first amount of memory, the program memory stores an image of the boot loader program prior to execution.*

*37. The integrated circuit of claim 1 wherein an image of the boot loader program is subject to a validation process to identify a tamper event and execution of the boot loader program is performed only after the image is validated.*

*38. The integrated circuit of claim 37 wherein the validation process comprises a CRC check.*

*39. The integrated circuit of claim 37 wherein the encryption key is erased in response to a failure of the image to be validated.*

*40. The integrated circuit of claim 36 wherein the program memory comprises Flash memory.*

*41. The integrated circuit of claim 36 wherein the program memory comprises RAM memory.*

*42. The integrated circuit of claim 1 further comprising a bridge coupled between a first bus and a second bus, the bridge providing an interface between the first and second buses.*

*43. The integrated circuit of claim 42 wherein the first bus is an Advanced Microcontroller Bus and the second bus is an Advanced Peripheral Bus.*

*44. The integrated circuit of claim 1 further comprising a debug interface coupled to the processor and the tamper control circuitry, the debug interface provides external access to at least a portion of the integrated circuit during a test procedure.*

*45. The integrated circuit of claim 44 wherein the debug interface is a JTAG port.*

*46. The integrated circuit of claim 1 further comprising a backup battery coupled to a battery interface, the backup*

*battery provides power to at least a portion of the integrated circuit if power is lost from a primary power source.*

*47. The integrated circuit of claim 46 wherein the backup battery is coupled to the tamper control circuitry.*

*48. The integrated circuit of claim 1 further comprising a UART coupled to at least one interface that allows communication with an external device.*

*49. The integrated circuit of claim 1 further comprising a secure memory coupled to the tamper control circuitry, the secure memory stores sensitive data.*

*50. The integrated circuit of claim 49 wherein the secure memory is located within the integrated circuit.*

*51. The integrated circuit of claim 49 wherein the secure memory stores at least one type of data selected from a group consisting of encryption keys, passwords and account numbers.*

*52. The integrated circuit of claim 1 wherein the integrated circuit operates in a plurality of modes, a first mode having limited access rights and functionality compared to a second mode within the plurality of modes.*

*53. The integrated circuit of claim 1 further comprising a network interface, the network interface allows secure transmission of data to a third party across a network.*

*54. The integrated circuit of claim 1 further comprising a user authentication interface that authenticates a user to a session.*

*55. The integrated circuit of claim 54 wherein the user authentication interface receives a user signature.*

*56. The integrated circuit of claim 54 wherein the user authentication interface receives a password.*

*57. The integrated circuit of claim 4 further comprising at least one temperature sensor coupled to the tamper control circuitry, the at least one temperature sensor detects a temperature variation associated indicative of a tamper event.*

*58. The integrated circuit of claim 57 wherein an output of the at least one temperature sensor is compared to a threshold temperature value to identify the tamper event.*

*59. The integrated circuit of claim 4 further comprising at least one voltage sensor coupled to the tamper control circuitry, the at least one voltage sensor detects a voltage variation associated indicative of a tamper event.*

*60. The integrated circuit of claim 59 wherein an output of the at least one voltage sensor is compared to a threshold voltage value to identify the tamper event.*

*61. The integrated circuit of claim 4 wherein the second amount of memory comprises a plurality of registers within the integrated circuit.*

*62. The integrated circuit of claim 4 wherein the second amount of memory comprises a RAM memory.*

*63. The integrated circuit of claim 4 wherein the second amount of memory comprises a Flash memory.*

*64. The integrated circuit of claim 4 further comprising program memory coupled to the first amount of memory, the program memory stores an image of the boot loader program prior to execution.*

*65. The integrated circuit of claim 4 wherein an image of the boot loader program is subject to a validation process to identify a tamper event and execution of the boot loader program is performed only after the image is validated.*

*66. The integrated circuit of claim 65 wherein the validation process comprises a CRC check.*

*67. The integrated circuit of claim 65 wherein the encryption key is erased in response to a failure of the image to be validated.*

*68. The integrated circuit of claim 64 wherein the program memory comprises Flash memory.*

*69. The integrated circuit of claim 64 wherein the program memory comprises RAM memory.*

*70. The integrated circuit of claim 4 further comprising a backup battery coupled to a battery interface, the backup battery provides power to at least a portion of the integrated circuit if power is lost from a primary power source.*

*71. The integrated circuit of claim 70 wherein the backup battery is coupled to the tamper control circuitry.*

*72. The integrated circuit of claim 11 further comprising at least one temperature sensor coupled to the tamper control circuitry, the at least one temperature sensor detects a temperature variation associated indicative of a tamper event.*

*73. The integrated circuit of claim 11 further comprising at least one voltage sensor coupled to the tamper control circuitry, the at least one voltage sensor detects a voltage variation associated indicative of a tamper event.*

*74. The integrated circuit of claim 11 wherein the second amount of memory comprises a plurality of registers within the integrated circuit.*

*75. The integrated circuit of claim 11 wherein the encryption key is erased in response to a check of the valid image failing.*

* * * * *